(12) United States Patent
Dorget et al.

(10) Patent No.: US 6,590,026 B1
(45) Date of Patent: Jul. 8, 2003

(54) COATING COMPOSITIONS CONTAINING FUNCTIONALIZED SILICONES

(75) Inventors: Michel Dorget, Paris (FR); Mathieu Joanicot, Lawrenceville, NJ (US); Gérard Mignani, Lyons (FR); Paul Branlard, Lyons (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/806,737

(22) PCT Filed: Oct. 5, 1999

(86) PCT No.: PCT/FR99/02377

§ 371 (c)(1),
(2), (4) Date: Jun. 25, 2001

(87) PCT Pub. No.: WO00/20524

PCT Pub. Date: Apr. 13, 2000

(30) Foreign Application Priority Data

Oct. 5, 1998 (FR) .............................. 98 12439

(51) Int. Cl.$^7$ ............................................. C08L 83/06
(52) U.S. Cl. ...................... 524/588; 524/501; 524/401; 525/479; 525/185; 106/287.13
(58) Field of Search ................. 524/501, 588, 524/401; 525/479, 185; 106/287.13

(56) References Cited

U.S. PATENT DOCUMENTS 5,618,879 A * 4/1997 Cavivenc et al.
5,837,745 A * 11/1998 Safta et al.

FOREIGN PATENT DOCUMENTS

| EP | 0 520 466 | 12/1992 | ............. C09D/5/02 |
| EP | 0 561668 | 9/1993 | ......... C09F/133/06 |
| EP | 0 635 526 | 1/1995 | ......... C08F/283/12 |
| FR | 2 783 012 | 2/1997 | ......... C09D/133/00 |

OTHER PUBLICATIONS

International Search Report.

* cited by examiner

*Primary Examiner*—Robert Dawson
*Assistant Examiner*—Kuo-Liang Peng

(57) ABSTRACT

The invention concerns a coating composition, in particular a paint comprising (A) 3 to 30 parts of a latex consisting of organic (co)polymers having a glass transition temperature ranging between −20° C. and 50° C.; (B) 0.05 to 5 parts of an epoxyfunctionalized polyorganosiloxane emulsion; (C) and 100 parts of mineral fillers.

10 Claims, No Drawings

COATING COMPOSITIONS CONTAINING FUNCTIONALIZED SILICONES

This application under 35 U.S.C. Section 371 of International Application Number PCT/FR99/02377 filed on Oct. 05, 1999.

The present invention relates to novel coating compositions, in particular paint compositions. These compositions can be used in various applications, such as water paints, roughcasts, transparent coatings, impregnations or semi-thick coatings (STC).

The prior art does not indicate a coating composition capable of correctly and satisfactorily crosslinking by condensation into an elastomer or a crosslinked material which confers, on the final application, for example in the form of a paint, a high wet abrasion resistance (WAR), a satisfactory impermeability to water and a satisfactory permeability to water vapor. In addition, the prior art does not indicate coating compositions which have a high and enduring stability on storage (maintenance of the content of VOCs or of alcohols produced in situ below a breakdown threshold of the composition).

One of the essential objectives of the present invention is thus to provide a novel coating composition which confers, on the final application, efficient water-repellency, that is to say high wet abrasion resistance (WAR), satisfactory impermeability to water, satisfactory permeability to water vapor and a satisfactory pearling effect. In addition, the novel coating composition has a high and enduring stability on storage.

More specifically, the novel coating composition developed, which forms the subject-matter of the present invention, comprises:

(A) 3 to 30 parts (solids content at approximately 50% by weight) of a latex composed of particles of organic (co)polymers exhibiting a glass transition temperature of between −20° C. and 50° C., (B) 0.05 to 5 parts (solids content at approximately 65% by weight) of an epoxyfunctionalized polyorganosiloxane emulsion, (C) and 100 (solids content at approximately 75% by weight) parts of inorganic fillers.

In the context of the invention, the parts (A) and (B) form what is known as the binder of the coating composition.

The latex used in the context of the composition according to the invention is prepared from polymerizable monomers (1) chosen from styrene, butadiene, acrylic esters and/or vinyl nitriles.

The term "acrylic esters" denotes esters of acrylic acid and of methacrylic acid with $C_1$–$C_{12}$, preferably $C_1$–$C_8$, alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate.

The vinyl nitriles include those having from 3 to 12 carbon atoms, in particular acrylonitrile and methacrylonitrile.

Styrene can be replaced, in all or in part, by amethylstyrene or vinyltoluene.

Other ethylenically unsaturated monomers (2) which can be polymerized with the above monomers (1), the amount of which can range up to 40% by weight of the total of the monomers, can also be used for the preparation of the latex of the composition according to the invention. Mention may be made of:

(a) carboxylic acid vinyl esters, such as vinyl acetate, vinyl versatate or vinyl propionate, (b) unsaturated ethylenic mono- and dicarboxylic acids, such as acrylic acid, methacrylic acid, itaconic acid, maleic acid or fumaric acid, and monoalkyl esters of the dicarboxylic acids of the type mentioned with alkanols preferably having 1 to 4 carbon atoms and their N-substituted derivatives, (c) amides of unsaturated carboxylic acids, such as acrylamide, methacrylamide, N-methalolacrylamide or -methacrylamide, (d) ethylenic monomers comprising a sulfonic acid group and its alkali metal or ammonium salts, for example vinylsulfonic acid, vinylbenzenesulfonic acid, a-acrylamido-methylpropanesulfonic acid or 2-sulfoethylene methacrylate, (e) ethylenically unsaturated monomers comprising a secondary, tertiary or quaternary amino group or a heterocyclic group comprising nitrogen, for example vinylpyridines, vinylimidazole, aminoalkyl (meth) acrylates and aminoalkyl(meth)acrylamides, such as dimethylaminoethyl acrylate or methacrylate, di-tert-butylaminoethyl acrylate or methacrylate, dimethylaminomethylacrylamide or -methacrylamide, as well as zwitterionic monomers, such as sulfopropyl (dimethyl)aminopropyl acrylate, and the like, (f) esters of (meth)acrylic acids with alkanediols preferably comprising 2–8 carbon atoms, such as glycol mono(meth)acrylate, hydroxypropyl mono(meth) acrylate or 1,4-butanediol mono(meth)acrylate, and monomers comprising two polymerizable double bonds, such as ethylene glycol dimethacrylate.

According to a preferred alternative form for the choice of the latex, the latter comprises, by weight:

25–90% and preferably 45–75% of styrene and/or acrylonitrile,

75–10% and preferably 55–25% of butadiene and/or acrylates,

0–20% and preferably 1–10% of unsaturated carboxylic acid, and 0–40% and preferably 0–15% of other unsaturated ethylenic monomers.

The polymerization of the latex is carried out in a way known per se in an aqueous emulsion of the polymerizable monomers in the presence of at least one radical initiator and preferably of a transfer agent, for example of the mercaptan type, with a concentration of monomers in the reaction medium generally of between 20 and 60% by weight.

The polymerization can be carried out continuously, batchwise or semicontinuously with introduction of a portion of the monomers continuously and can be of the "seeded" or "incremental" type according to any alternative form known for the production of particles with a homogeneous and heterogeneous structure.

For the preparation of the latex, reference will be made, as non-limiting example, to the procedures disclosed in patent EP 599 676 on behalf of the present applicant company.

Mention may be made, as examples of inorganic fillers of the composition according to the invention, of milled quartz, kaolin, fumed silica, precipitated silica, calcium carbonate, barium sulfate, titanium oxide, talc, hydrated alumina, bentonite, calcium sulfoaluminate, and the like.

The epoxyfunctionalized polyorganosiloxanes of the composition according to the invention are linear and/or cyclic. Identical or different polyorganosiloxanes can be used within the same coating composition. These polyorganosiloxanes are composed of units of formula (I) and are terminated by units of formula (II) and/or are composed of units of formula (I) which are represented below:

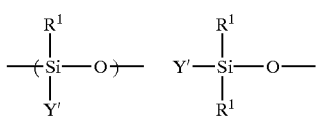 (II)

in which:
the $R^1$ symbols are alike or different and represent:
a linear or branched alkyl radical comprising from 1 to 8 carbon atoms, the alkyl radicals preferably being methyl, ethyl, propyl and octyl,
a cycloalkyl radical comprising between 5 and 8 cyclic carbon atoms which is optionally substituted,
an aryl radical comprising between 6 and 12 carbon atoms which can be substituted, preferably phenyl or dichlorophenyl,
an aralkyl part having an alkyl part comprising between 5 and 14 carbon atoms and an aryl part comprising between 6 and 12 carbon atoms which is optionally substituted on the aryl part by halogens, alkyls and/or alkoxyls comprising 1 to 3 carbon atoms,
the Y' symbols are alike or different and represent:
the $R^1$ group,
and/or an epoxyfunctional group, connected to the silicon of the polyorganosiloxane via a divalent radical comprising from 2 to 20 carbon atoms which can comprise at least one heteroatom, preferably oxygen,
and at least one of the Y' symbols representing an epoxyfunctional group.

The linear polyorganosiloxanes can be oils with a dynamic viscosity at 25° C. of the order of 10 to 10 000 mPa·s at 25° C., generally of the order of 50 to 5000 mPa·s at 25° C. and more preferably still of 100 to 600 mPa·s at 25° C., or gums exhibiting a molecular mass of the order of 1000000.

When cyclic polyorganosiloxanes are involved, these are composed of units (II) which can be, for example, of the dialkylsiloxy or alkylarylsiloxy type. These cyclic polyorganosiloxanes exhibit a viscosity of the order of 1 to 5000 mPa·s.

Mention may be made, as examples of divalent radicals connecting an organofunctional group of the epoxy type, of those included in the following formulae:

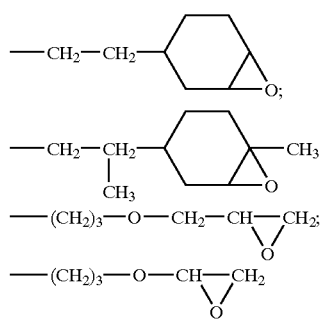

The dynamic viscosity at 25° C. of all the silicones considered in the present description can be measured using a Brookfield viscometer according to the AFNOR standard NFT 76 102 of February 1972.

The production of such functionalized polyorganosiloxanes is entirely within the scope of a person skilled in the art of the chemistry of silicones.

According to an advantageous alternative form, the composition of the invention comprises from 5 to 100 organofunctional groups per 100 Si units and preferably from 20 to 40, which makes it possible to obtain an excellent compromise between the stability of the composition and its water repellency.

In addition to the three main constituents of the coating composition of the invention, the latter can comprise 0.1 to 10 (dry) parts of additives, such as antifoamting agent(s), biocide(s), surfactant(s), rheological agent(s), coalescence agent(s), dispersing agent(s), neutralizing agent(s) and thickening agent(s).

For the preparation of the coating composition, the various constituents are mixed in a way known per se.

The coating composition according to the invention can be applied according to the usual techniques. By way of example, it can be applied to surfaces by any suitable means, such as brush, sprayer, and the like. The surfaces to which the coating composition according to the invention can be applied are various in nature: for example, metal, such as aluminum, wood, cement or brick, with or without precoating with an adhesion primer.

The following examples and tests are given by way of illustration. They make possible in particular a better understanding of the invention and make it possible to reveal all its advantages and to perceive some alternative embodiments.

EXAMPLES AND TESTS

The examples and tests show a high wet abrasion, satisfactory impermeability to water and satisfactory permeability to water vapor of the coatings obtained from compositions according to the invention. In addition, the measurement of the angle of water drops demonstrates the pearling properties of the compositions of the invention.

Various tests were used:

Test of Wet Abrasion Resistance (WAR): DIN standard 53778

Test of permeability to water vapor: DIN standard 52615

Test of water absorption: DIN standard 52617, and

Measurement of the water drop angle.

The tests were modified for the compositions of example F. These modifications are specified in paragraph II of example F.

Example A

I. Ecological Matt Paint Compositions (i) The paint compositions tested are given in table 1 and comprise:

130 g of calcium carbonate, Hydrocarb 90 (Solids content=75%), 20 g of latex, DS 1003 from Rhodia Chimie (Solids content=50%, based on styrene, butyl acrylate and acrylic acid)

and 0.15 g of polyorganosiloxane emulsion (Solids content=65%), the polyorganosiloxane corresponding to the formula (III) below

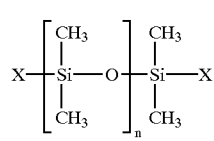 (III)

For the compositions A-4 to A-7 of the invention X of the polyorganosiloxane is the same as:

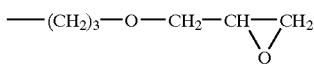

For the composition A-1, X of the polyorganosiloxane is CH$_3$. For the compositions A-2 and A-3, X is the same as OH.

(ii) Emulsification of the polyorganosiloxanes tested.

Emulsification is carried out by the concentrated direct emulsification method using 5% of Soprophor BSU surfactant (ethoxylated tristyrylphenol), 65% of polyorganosiloxane and 30% of water.

II. Test of the Wet Abrasion Resistance

This test of wet abrasion resistance is based on the test corresponding to DIN standard 53778.

The paint composition is prepared. It is then either coated immediately or is coated after aging for one week at 55° C. (in a pot) on a rigid Leneta substrate (200 microns wet).

The paint is subsequently dried for 24 h at 55° C. and then reconditioned for 24 h at 23° C. and 55% relative humidity.

The dry film is subsequently abraded under wet conditions. The number of abrasion cycles which it can endure is counted.

III. Results

The results are given in table 1.

TABLE 1

| Compositions | n | WAR$_{immediate}$ | WAR$_{aged}$ |
| --- | --- | --- | --- |
| A-0 (no polyorganosiloxane) | / | 450 | 470 |
| A-1 | 13 | 470 | / |
| A-2 | 33 | 390 | / |
| A-3 | 81 | 500 | / |
| A-4 | 8 | 1300 | 1100 |
| A-5 | 15 | 760 | 790 |
| A-6 | 30 | 720 | 730 |
| A-7 | 100 | 510 | 550 |

IV. Comments

The compositions according to the invention make it possible to increase the WAR.

The compositions A-0 to A-3 are ineffective.

The increase in the WAR is identical after aging for one week at 55° C. for the compositions according to the invention.

Example B

I. Ecological Matt Paint Compositions: Variation in the Content of Polyorganosiloxane (i) The paint compositions tested are given in table 2 and comprise:

130 dry g of calcium carbonate, Hydrocarb 90 (SC=75%), 20 dry g of latex DS 1003 (SC=50%), and 0.15 dry g of polyorganosiloxane with the composition A-5.

(ii) The emulsification of the polyorganosiloxane is identical to the above.

II. Tests Carried Out (i) Measurement of the WAR

The measurement of the WAR is carried out as above.

(ii) Measurement of the water drop angle

The measurement of the water drop angle is carried out on identical dry films. To do this, the angle which this drop of water makes with the surface of the film is measured.

III. Results

The results are given in table 2.

TABLE 2

| Content (x in g) | 0 | 0.15 | 0.5 | 1 | 1.5 | 3 |
| --- | --- | --- | --- | --- | --- | --- |
| WAR$_{immediate}$ | 690 | 980 | 1700 | 2300 | 4200 | 5400 |
| Water drop angle | 73° | 87 | 94 | 97 | 100 | 97 |

IV. Comment

The higher the concentration of polyorganosiloxane, the greater the WAR.

In addition, the higher the concentration of polyorganosiloxane, the greater the angle which the drop of water makes. Above 90°, the surface is pearling. Thus, a satisfactory pearling effect is observed from 3% of polyorganosiloxane with respect to the latex (weight/weight).

Example C

I. Ecological Matt Paint Compositions (i) The paint compositions tested are given in table 3 and comprise:

130 g of calcium carbonate, Hydrocarb 90 (Solids content=75%), 20 g of latex, DS 1003 from Rhodia Chimie (Solids content=50%), and 0.15 g of linear polyorganosiloxane emulsion (Solids content=65%), the polyorganosiloxane corresponding to the formula (IV) below:

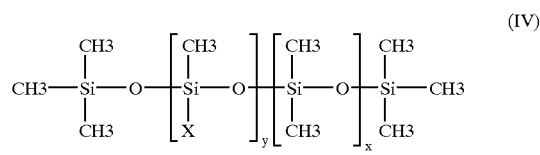

(IV)

in which X is the same as:

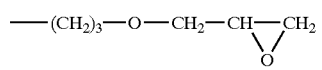

TABLE 3

| Compositions | x | y | x + y | Concentration of Si-epoxy unit/total of Si units |
| --- | --- | --- | --- | --- |
| C-1 | 23 | 2 | 25 | 7% |
| C-2 | 11 | 2 | 13 | 13% |
| C-3 | 21 | 4 | 25 | 15% |

TABLE 3-continued

| Compositions | x | y | x + y | Concentration of Si-epoxy unit/total of Si units |
|---|---|---|---|---|
| C-4 | 6 | 2 | 8 | 20% |
| C-5 | 9 | 4 | 13 | 27% |

(ii) The emulisification of the polyorganosiloxanes is carried out as above.

II. Test Carried Out

The measurement of the WAR is carried out as above.

III. Results

See table 4.

TABLE 4

| Compositions | $WAR_{immediate}$ | $WAR_{aged}$ |
|---|---|---|
| No polyorganosiloxane | 600 | 530 |
| C-1 | 950 | 960 |
| C-2 | 1000 | 1100 |
| C-3 | 990 | 990 |
| C-4 | 1500 | 1400 |
| C-5 | 1600 | 1700 |

IV. Comment

The compositions according to the invention with a polyorganosiloxane for which the epoxyfunctional groups are not at the chain end are just as effective as a polyorganosiloxane for which the epoxyfunctional groups are at the chain end.

The higher the degree of grafting, the greater the WAR. The compositions are always stable after aging for 1 week at 55° C.

Example D

I. Ecological Matt Paint Compositions with Variation in the Level of Si-Epoxy/Total of Si Units (i) The paint compositions tested are given in table 5 and comprise:

130 g of calcium carbonate, Hydrocarb 90 (Solids content=75%), 20 g of latex, DS 1003 from Rhodia Chimie (Solids content=50%)

and 0.15 g of linear polyorganosiloxane emulsion (Solids content=65%), the polyorganosiloxane corresponding to one of the formulae below:

$$CH_3-\underset{\underset{CH_3}{|}}{\overset{\overset{CH_3}{|}}{Si}}-O-\left[\underset{\underset{X}{|}}{\overset{\overset{CH_3}{|}}{Si}}-O\right]_y-\left[\underset{\underset{CH_3}{|}}{\overset{\overset{CH_3}{|}}{Si}}-O\right]_x-\underset{\underset{CH_3}{|}}{\overset{\overset{CH_3}{|}}{Si}}-CH_3 \quad \text{or} \quad (IV)$$

$$X-\left[\underset{\underset{CH_3}{|}}{\overset{\overset{CH_3}{|}}{Si}}-O\right]_n-\underset{\underset{CH_3}{|}}{\overset{\overset{CH_3}{|}}{Si}}-X \quad (III)$$

in which X is the same as:

$$-(CH_2)_3-O-CH_2-CH\underset{O}{\overset{}{\diagdown\diagup}}CH_2$$

TABLE 5

| Compositions | X | y | n | Concentration of Si-epoxy unit/total of Si units) |
|---|---|---|---|---|
| D-1 (formula IV) | 8 | 7 | / | 41% |
| D-2 (formula IV) | 3 | 8 | / | 62% |
| D-3 (formula IV) | 0 | 20 | / | 91% |
| D-4 (formula III) | / | / | 1 | 100% |

(ii) The emulsification of the polyorganosiloxanes is carried out as in the preceding examples.

II. Test Carried Out: Measurement of the WAR

The measurement of the WAR is carried out as above.

III. Results

The results are given in table 6.

TABLE 6

| Compositions | $WAR_{immediate}$ | $WAR_{aged}$ |
|---|---|---|
| D-0 (without polyorganosiloxane) | 790 | 630 |
| D-1 | 1800 | 1600 |
| D-2 | 2600 | 1600 |
| D-3 | 4600 | 1600 |
| D-4 | 62000 | 1400 |

VI. Comment

The higher the percentage of Si-epoxy/total of Si units, the more effective the composition with respect to fresh baths.

However, for the aged compositions, the WAR results are not similar to those of the immediately tested compositions. This is because it is noticed that, beyond 40% of Si-epoxy, the difference of $WAR_{immediate}$ and $WAR_{aged}$ is very large, which means that the compositions are not stable.

Thus, the optimal level of Si-epoxy/total of Si units of the polyorganosiloxane is below 40%.

Example E

I. Breathing Exterior Paint Compositions

The compositions prepared all comprise 100 g of calcium carbonate, Hydrocarb 90, and 12 g of latex, DS 910 from Rhodia Chimie, with 10% of coalescence agent, Texanol from Eastman Kodak.

(i) The compositions according to the invention comprise a 3rd component, that is to say X g of polyorganosiloxane emulsion, the polyorganosiloxane having the formula:

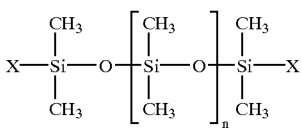

in which n is equal to 8 and X is the same as:

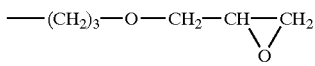

They correspond to the compositions E-6 to E-9. The amounts of polyorganosiloxanes vary within the compositions E-6 to E-9 and are given in table 7. The emulsification of the polyorganosiloxane is carried out in a way identical to that used in example 1.

(ii) The compositions E-2 to E-5 comprise, instead of the polyorganosiloxane, a reference silicone resin, Rhodorsil 865A from Rhodia Chimie. The amounts of resin vary within the compositions E-2 to E-5 and are given in table 7.

II. Tests Carried Out (i) WAR and water drop angle.

The WAR and the water drop angle are measured as in the preceding examples.

(ii) Permeability to water.

The measurement of the permeability to water is made in agreement with a procedure based on DIN standard No. 52617.

The paint composition is coated on an earthenware tile (thickness of the paint: 2 mm). After partial evaporation of the water, the half-dry paint is cut out and detached as a disk with a diameter of 40 mm, which makes it possible to obtain an unsupported paint.

After drying and reconditioning the paint, the latter is immersed in water. Gravimetric monitoring makes it possible to determine the amount of water taken up by the paint.

From the curve of the readings obtained, the water absorption coefficient W is determined as a function of the formula: $m(t)=m_0+WS.t^{1/2}$, where m is the mass of the composite, S is its surface area (counting both faces) and t is the time.

iii) Permeability to water vapor.

The measurement of the permeability to water vapor is made in agreement with a procedure based on DIN standard No. 52615. For this, the Sd factor, which is equal to 0.09/Pe, is determined; this Sd factor corresponds to the thickness of air which would have the same permeability as a paint with a thickness of 100 microns (Pe is in $g^{+1}h^{-1}m^{-2}mmHg^{-1}$ and Sd is in m).

The unsupported paint, obtained as above, is used as lid on a pot filled with water.

The pot is placed at a temperature of 23° C. and a relative humidity of 50%. The amount of water present in the pot is monitored as a function of time.

The permeability to water vapor Pe is defined by: $m(t)=m_0-(Pe.S.\Delta p).t$, where m is the mass of water and $\Delta p$ is the difference in partial pressure of the water between the pot and the atmosphere, i.e. 10.54 mmHg.

III. Results

The results are given in table 7.

IV. Comments

A marked improvement in the WAR is recorded with the compositions of the invention with respect to the paint compositions in which the 3rd component is a resin.

The permeability to water is markedly improved for the compositions according to our invention. In the same way, the pearling aspect of the paint is reinforced by the compositions according to the invention E-6 to E-9.

TABLE 7

| Compositions | Amount of the 3rd component | PVC % | WAR | Sd m | W kg/m²h^{1/2} | Water drop angle |
|---|---|---|---|---|---|---|
| E-0 | 0 | 77 | 13000 | 0.0103 | 0.065 | 75 |
| E-2 | 2 g | 73 | 5200 | 0.0124 | 0.055 | 73 |
| E-3 | 5 g | 69 | — | 0.0118 | 0.047 | 66 |
| E-4 | 10 g | 63 | 2500 | 0.0133 | 0.06 | 100 |
| E-5 | 20 g | 54 | 1600 | — | 0.025 | 91 |
| E-6 | 0.5 g | 75 | — | 0.0124 | 0.015 | 116 |
| E-7 | 1 g | 74 | — | 0.0125 | 0.013 | 119 |
| E-8 | 1.5 g | 73 | — | 0.0137 | 0.009 | 120 |
| E-9 | 2 g | 73 | 79000 | 0.0144 | 0.008 | 109 |

PVC = pigment volume capacity

Example F

I. Breathing Paint Compositions (PVC=70%)

(i) The paints tested, E10 to E13, are formulated from a pigment paste with the composition given in table 8. The paste is dispersed at 3000 rev/min for 15 minutes.

(ii) The paints comprise other ingredients added within the dispersions according to the invention. The types and the amounts of the additional ingredients are shown in table 9. After addition, the medium is stirred at 500 rev/min for 15 minutes.

The emulsification of the silicones used is carried out in a way identical to that used in example 1.

The polyorganosiloxane used within the emulsion according to the invention is of formula (IV), where y is equal to 4, x is equal to 9 and the X functional group is the same as:

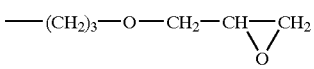

TABLE 9

|  | E10 | E11 | E12 | E13 |
|---|---|---|---|---|
| Styrene-acrylic dispersion with SC = 50% (Rhodopas ® DS910 from Rhodia Chimie). | 9.2 | 9.2 | 15.8 | 9.4 |
| Non-epoxidized silicone emulsion with SC = 42% (Rhodorsil ® 865A from Rhodia Chimie). | 10.0 | 0 | 0 | 0 |
| Non-epoxidized silicone emulsion with SC of 53% (Rhodorsil ® 1854 PEX from Rhodia Chimie). | 0 | 8 | 0 | 6.9 |
| Epoxidized polyorganosiloxane of formula (IV) with SC of 50%. | 0 | 0 | 1.9 | 1 |
| Water | 0.5 | 2.5 | 2 | 2.4 |

TABLE 8

| Ingredients | Weight | Functions |
|---|---|---|
| Water | 20.1 |  |
| Na hexametaphosphate (10% H₂O) | 0.5 | Neutralizing agent |

TABLE 8-continued

| Ingredients | Weight | Functions |
| --- | --- | --- |
| Proxel GXL from Zeneca | 0.3 | Biocide |
| Rhodoline DP 1120 from Rhodia Chimie | 0.3 | Dispersing agent |
| Rhodoline DF 6002 from Rhodia Chimie | 0.2 | Antifoaming agent |
| Natrosol 250H from Aqualon | 0.2 | Thickening agent |
| RCL 568 from Millenium | 12.1 | Titanium dioxide |
| Omyacarb SGU from Omya | 24.1 | Filler |
| Calibrite SL from Omya | 10.1 | Filler |
| Talc 10 MO from Luzenac | 4 | Filler |
| Plastorit 000 from Luzenac | 4 | Filler |
| Celite 281 from Manville | 3 | Filler |
| Texanol from Eastman | 1.1 | Coalescence agent |
| Rhodoline RH 5210 from Rhodia Chimie | 0.3 | Thickening agent |

II. Tests Carried Out (i) WAR according to DIN standard 53778 part 2.

This factor, expressed as number of cycles, represents the ability of a film of paint of defined thickness to withstand the abrasive action exerted by the to-and-fro movement of a brush in the presence of a surfactant-based solution.

(ii) Permeability to water vapor

The measurement of the permeability to water vapor is made in agreement with a procedure based on EN standard No. 1062-3.

The Sd coefficient, expressed in meters, which represents the thickness of static air which has the same permeability to water vapor, is calculated. This coefficient is obtained by calculation from measurements of losses in weight of a dish filled with water and with an ammonium dihydrogenphosphate solution and closed by a polyethylene substrate coated with the paint to be evaluated.

<: permeability to water vapor: $V = 240 \times m / A \times t (g.m^2/24\ h)$

A: surface area of the sample: $50.27\ cm^2$ m: loss in mass mg t: time 72 h

Sd: $21/V$ (m)

(iii) Permeability to water

The measurement of the permeability to water is made in agreement with a procedure based on EN standard No. 1062-2.

The W factor, expressed in $kg.m^{-2}.h^{-0.5}$, which represents the ability of the paint coating to absorb liquid water (per unit of surface area and of time), is calculated. It is obtained by weighing: the uptake in weight of a liking tile coated with the paint to be tested and kept in contact with a surface saturated with water is monitored.

III. Results

The results are given in table 10.

TABLE 10

| | Pigment volume capacity PVC | WAR (cycles) | Sd (m) | W $(kg/m^2h^{1/2})$ | Water drop angle (°) |
| --- | --- | --- | --- | --- | --- |
| E10 | 70% | 1500 | 0.05 | 0.16 | 80 |
| E11 | 70% | 3800 | 0.03 | 0.14 | 80 |
| E12 | 70% | >>5000 | 0.03 | 0.03 | 130 |
| E13 | 70% | 4200 | 0.03 | 0.07 | 120 |

IV. Comments

An improvement in the WAR with the compositions of the invention is recorded with respect to the compositions in which non-epoxidized silicones are introduced.

The permeability to water is improved for the compositions according to our invention. Furthermore, the pearling aspect of the paints according to the invention is reinforced.

What is claimed is:

1. A coating composition comprising:

(A) 3 to 30 parts, with solids content at about 50% by weight, of a latex composed of particles of organic (co)polymers exhibiting a glass transition temperature of between −20° C. and 50° C., (B) 0.05 to 5 parts, with solids content at about 65% by weight, of an epoxyfunctionalized polyorganosiloxane emulsion, and (C) and 100 parts, with solids content at about 75% by weight, of inorganic fillers.

2. The composition as claimed in claim 1, wherein the latex is prepared from monomers (1) which are styrene, butadiene, acrylic esters or vinyl nitrites.

3. The composition as claimed in claim 2, wherein the latex preparation comprises further ethylenically unsaturated monomers (2) which can be polymerized with said monomers (1), the amount of which is up to 40% by weight of the total of the monomers, said monomers (2) being:

(a) carboxylic acid vinyl esters, (b) unsaturated ethylenic mono- and dicarboxylic acids, monoalkyl esters of unsaturated ethylenic dicarboxylic acids with alkanols having 1 to 4 carbon atoms, (c) amides of unsaturated carboxylic acids, (d) ethylenic monomers comprising a sulfonic acid group, its alkali metal, its ammonium salts, (e) ethylenically unsaturated monomers comprising a secondary, tertiary or quaternary amino group or a heterocyclic group comprising nitrogen, aminoalkyl (meth)acrylamides, or zwitterionic monomers, (f) esters of (meth)acrylic acids with alkanediols comprising 2–8 carbon atoms, or monomers comprising two polymerizable double bonds.

4. The composition as claimed in claim 3, wherein said monomers (2) is:

(a) vinyl acetate, vinyl versatate, vinyl propionate, (b) acrylic acid, methacrylic acid, itaconic acid, maleic acid, fumaric acid, (c) acrylamide, methacrylamide, N-methalolacrylamide, N-methalolmetha-acrylamide, (d) vinylsulfonic acid, vinylbenzenesulfonic acid, acrylamidomethylpropanesulfonic acid, 2-sulfoethylene methacrylate, (e) dimethylaminoethyl acrylate, dimethylaminoethyl methacrylate, di-tert-butylaminoethyl acrylate, di-tert-butylaminoethyl methacrylate, dimethylaminomethylacrylamide, dimethylaminomethylmethacrylamide, sulfopropyl (dimethyl)aminopropyl acrylate.

(f) glycol mono(meth)acrylate, hydroxypropyl mono (meth)acrylate, 1,4-butanediol mono(meth)acrylate, or ethylene glycol dimethacrylate.

5. The composition as claimed in claim 3, wherein the latex comprises, by weight:

25–90% of styrene and/or acrylonitrile,

75–10% of butadiene and/or acrylates,

0–20% of unsaturated carboxylic acid, and

0–40% of other unsaturated ethylenic monomers.

6. The composition as claimed in claim 5, wherein the latex comprises, by weight:

45–75% of styrene and/or acrylonitrile,

55–25% of butadiene and/or acrylates,

1–10% of unsaturated carboxylic acid, and

0–15% of other unsaturated ethylenic monomers.

7. The composition as claimed in claim 1, wherein the epoxy-functionalized polyorganosiloxane is composed of units of formula (I) and is terminated by units of formula (II) or is composed of units of formula (I) which are represented below:

wherein:

the $R^1$ symbols are alike or different and represent:

a linear or branched alkyl radical comprising from 1 to 8 carbon atoms, a cycloalkyl radical comprising between 5 and 8 cyclic carbon atoms which is optionally substituted, an aryl radical comprising between 6 and 12 carbon atoms which is optionally substituted, an aralkyl part having an alkyl part comprising between 5 and 14 carbon atoms and an aryl part comprising between 6 and 12 carbon atoms which is optionally substituted on the aryl part by halogens, alkyls or alkoxyls comprising 1 to 3 carbon atoms, the Y' symbols are alike or different and represent:

the $R^1$ group, or an epoxyfunctional group, connected to the silicon of the polyorganosiloxane via a divalent radical comprising from 2 to 20 carbon atoms optionally comprising at least one oxygen atom, and at least one of the Y' symbols representing an epoxy-functional group.

8. The composition as claimed in claim 7, wherein the epoxyfunctional groups are:

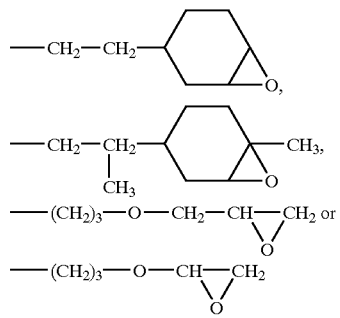

9. The composition as claimed in claim 1, wherein the coating is a paint.

10. A paint binder comprising:

(A) 3 to 30 parts, with solids content at about 50% by weight, of a latex composed of particles of organic (co)polymers exhibiting a glass transition temperature of between −20° C. and 50° C., and (B) 0.05 to 5 parts, with solids content at about 65% by weight, of an epoxyfunctionalized polyorganosiloxane emulsion.

* * * * *